US006928501B2

United States Patent
Andreas et al.

(10) Patent No.: US 6,928,501 B2
(45) Date of Patent: Aug. 9, 2005

(54) SERIAL DEVICE DAISY CHAINING METHOD AND APPARATUS

(75) Inventors: David C. Andreas, Austin, TX (US); Christopher D. Eckhoff, Austin, TX (US); Richard D. Loveman, Buda, TX (US)

(73) Assignee: Silicon Laboratories, Inc., Austin, TX (US)

( * ) Notice: Subject to any disclaimer, the term of this patent is extended or adjusted under 35 U.S.C. 154(b) by 502 days.

(21) Appl. No.: 09/977,795

(22) Filed: Oct. 15, 2001

(65) Prior Publication Data

US 2003/0074505 A1 Apr. 17, 2003

(51) Int. Cl.⁷ .............................................. G06F 13/00
(52) U.S. Cl. ...................... 710/110; 710/43; 710/115; 710/122; 710/104; 370/404; 370/405; 370/406
(58) Field of Search ................................ 370/404, 405, 370/406; 710/43, 115, 122, 8–19, 104, 110, 62, 72, 5; 713/1, 2, 100

(56) References Cited

U.S. PATENT DOCUMENTS

| | | | |
|---|---|---|---|
| 3,784,910 A | | 1/1974 | Sylvan |
| 3,798,607 A | * | 3/1974 | Minnick et al. ............... 365/80 |
| 3,996,561 A | * | 12/1976 | Kowal et al. .................. 710/43 |
| 4,443,866 A | * | 4/1984 | Burgiss, Sr. ................. 710/100 |
| 4,683,530 A | | 7/1987 | Quatse |
| 4,716,525 A | * | 12/1987 | Gilanyi et al. ............... 709/213 |
| 4,933,935 A | * | 6/1990 | Adams ........................ 370/406 |
| 4,959,775 A | * | 9/1990 | Yonekura ..................... 710/115 |
| 4,985,888 A | * | 1/1991 | Madge et al. ................ 370/405 |
| 5,291,490 A | | 3/1994 | Conti et al. |
| 5,384,786 A | * | 1/1995 | Dudley et al. ............... 714/784 |
| 5,404,460 A | * | 4/1995 | Thomsen et al. ............... 710/9 |
| 5,539,390 A | * | 7/1996 | Nagano et al. ......... 340/825.52 |
| 5,564,114 A | * | 10/1996 | Popat et al. ................. 710/105 |
| 5,577,172 A | | 11/1996 | Vatland et al. |
| 5,666,557 A | * | 9/1997 | Cassidy et al. ................. 710/8 |
| 5,928,345 A | * | 7/1999 | Tetzlaff et al. ............... 710/107 |
| 6,148,076 A | | 11/2000 | Eriksson et al. |
| 6,266,336 B1 | * | 7/2001 | Siegel et al. ................. 370/405 |
| 6,581,145 B1 | * | 6/2003 | Lu et al. ...................... 711/167 |
| 2002/0016875 A1 | * | 2/2002 | Yokohama .................... 710/62 |
| 2002/0019898 A1 | * | 2/2002 | Hayashi et al. ............. 710/110 |
| 2002/0188781 A1 | * | 12/2002 | Schoch et al. .............. 710/107 |
| 2004/0093450 A1 | * | 5/2004 | Andreas ...................... 710/110 |

FOREIGN PATENT DOCUMENTS

JP 03144840 A * 6/1991 ........... G06F/13/14

OTHER PUBLICATIONS

Cote, Stephan D., "Token–Ring Architecture (Details Count When Choosing a Topology)", 1996, pp. 1–12.*
Coulouris, George, et al., "Archive Material from Edition 2 of Distributed Systems: Concepts and Design," 1994, pp. 1 and 2.*
Weinmann, Ulrich, et al., "Device Selection for System Partitioning," 1995, IEEE Proceedings of the Conference on European Design Automation, p. 2–7.*
"Small Computer System Interface Bus Concurrent Maintenance Device," Aug. 1, 1993, IBM Technical Disclosure Bulletin, vol. 36, Issue 8, p. 261–262.*
Processor Intercommunication Register, IBM Technical Disclosure Bulletin, Sep. 1990, vol. 33, No. 4, pp. 309–311.

* cited by examiner

*Primary Examiner*—Mark H. Rinehart
*Assistant Examiner*—Donna K. Mason
(74) *Attorney, Agent, or Firm*—Davis & Associates; William D. Davis

(57) ABSTRACT

Methods and apparatus associated with a plurality of serial devices designed to communicate with a bus master in either a daisy chain or a normal configuration are provided. One method includes the step of serially providing a command sequence having a channel identifier to a given device of a plurality of daisy chained devices. The channel identifier is modified as it passes thru each daisy chained device. A specific device is identified or enabled when the channel identifier it receives matches a pre-determined value.

17 Claims, 8 Drawing Sheets

700

| 710<br>TARGETED DEVICE | 720<br>EMBEDDED COMMAND WORD RECEIVED | 730<br>EMBEDDED COMMAND WORD TRANSMITTED |
|---|---|---|
| 0000 | 0000 | 1111 |
| 0001 | 1000 | 0000 |
| 0010 | 0100 | 1000 |
| 0011 | 1100 | 0100 |
| 0100 | 0010 | 1100 |
| 0101 | 1010 | 0010 |
| 0110 | 0110 | 1010 |
| 0111 | 1110 | 0110 |
| 1000 | 0001 | 1110 |
| 1001 | 1001 | 0001 |
| 1010 | 0101 | 1001 |
| 1011 | 1101 | 0101 |
| 1100 | 0011 | 1101 |
| 1101 | 1011 | 0011 |
| 1110 | 0111 | 1011 |
| 1111 | 1111 | 0111 |

FIG. 7

SERIAL DEVICE DAISY CHAINING METHOD AND APPARATUS

FIELD OF THE INVENTION

This invention relates to the field of communications. In particular, this invention is drawn to communication between a bus master and associated serial devices.

BACKGROUND OF THE INVENTION

Several communication techniques are available for enabling communication between a processor or a bus master and a plurality of serial devices coupled to the processor. Typically, the processor communicates with one or more serial devices sharing a common communication bus. In the event the processor needs to communicate information to a specific serial device, the processor must be able to distinguish the devices from each other. Various techniques are available to enable individual identification or selection of the serial devices.

For example, a separate select line may be used to enable each serial device. The serial devices are capable of responding or acting on information communicated when their respective select lines are asserted. One disadvantage of this technique is the imposed requirement for dedicated pins or exclusive signal lines on the processor to handle the device select signals. In particular, a separate select signal line is required for each serial device to be uniquely enabled.

Another technique uses jumpers, switches, or other hardware mechanisms associated with the serial devices to permit assignment of a unique identifier for each serial device. Each serial device only responds to commands with an accompanying identifier that matches that of the serial device as determined by the jumpers, switches or other hardware.

One disadvantage of this technique is that knowledge of other devices in the system is necessary to avoid duplicate device identifier assignments. Serial devices cannot be simply replaced or added into the system without first assigning a unique identifier. In addition, each device must have the ability to be configured for any one of a number of potential identifier assignments. For integrated circuit based serial devices additional packaging pins may be required to enable the serial device to support more than one potential identifier assignment.

SUMMARY OF THE INVENTION

In view of limitations of known systems and methods, methods and apparatus of selecting serial devices having a common bus for communication with a bus master are described. The bus master designates the targeted serial device(s) for execution of a command sequence through the use of device selects and a channel identifier embedded in the command sequence.

The serial devices compare their respective received channel identifiers with a common pre-determined value. In one embodiment, the pre-determined value is selected from the set {x0h, xFh}. If the received channel identifier matches the pre-determined value, the device executes the command sequence. The choice of daisy chain or normal mode configuration determines whether an immediate source for the command sequence is the bus master or a preceding serial device in the daisy chain. Instead of assigning an individual unique static address to each serial device for comparison with a channel identifier communicated to all the serial devices, the devices use the same common pre-determined value for comparison with a received channel identifier. Methods for operating and apparatus incorporated into the serial devices enables implementation in either a daisy chain or a normal connectivity configuration such that only the bus master's operation is dependent upon the selected configuration A method includes the step of serially providing a command sequence having a first channel identifier to a first device of a plurality of daisy chained devices. The first channel identifier is modified to generate a second channel identifier for transmission to the next device in the daisy chain.

A serial device apparatus includes a serial input port for receiving a first command sequence having a first channel identifier and a remaining command sequence. The serial device further includes a daisy chain output port and command sequence processing logic. The command sequence processing logic modifies the first channel identifier to form a second channel identifier. The second channel identifier and the remaining command sequence are provided to the daisy chain output port.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 7 illustrates the transmitted CID provided from a first serial device to a second subsequently daisy chained serial device based on the CID received by the first serial device.

DETAILED DESCRIPTION

Figure 1:
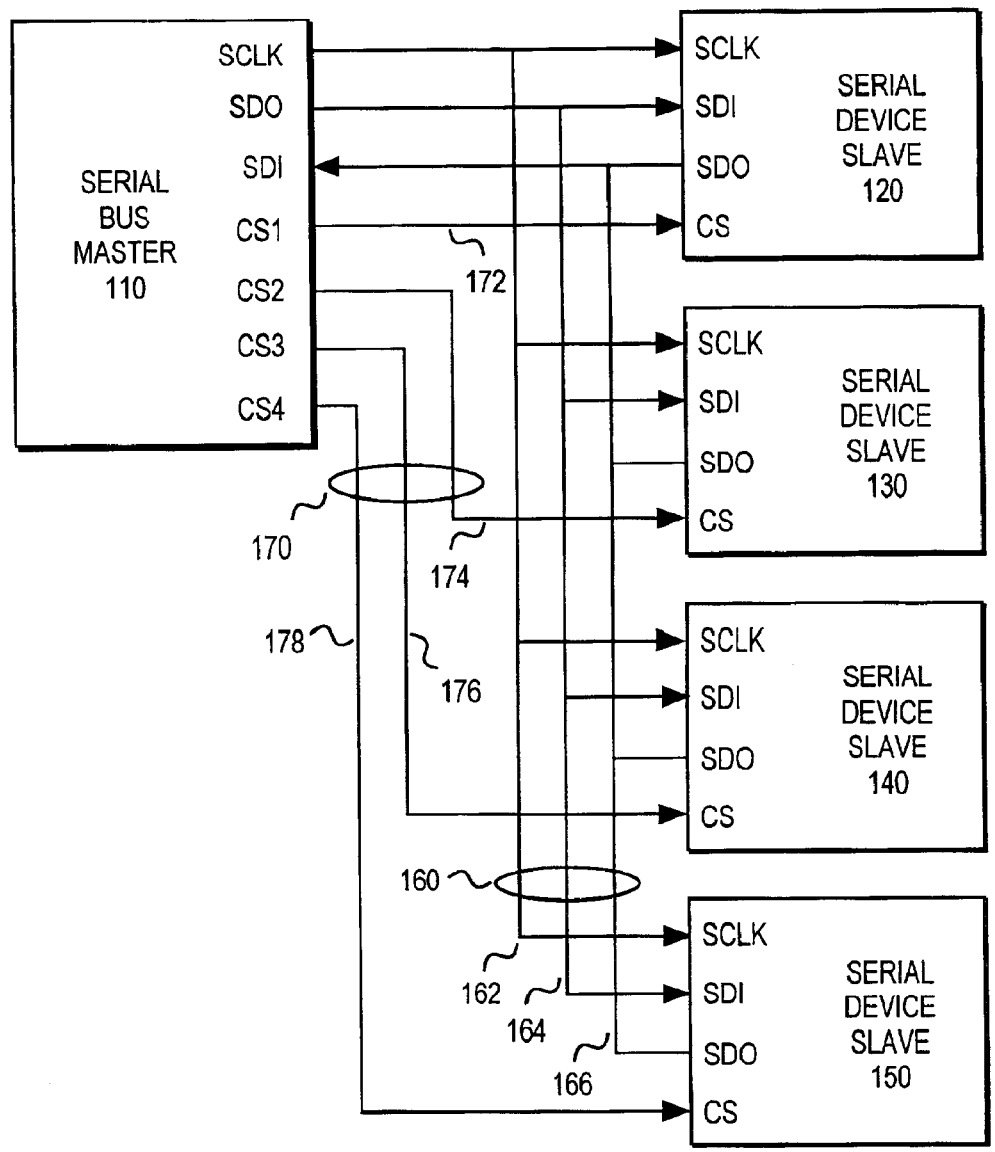
FIG. 1 illustrates a plurality of serial devices coupled to a serial bus master.

FIG. 1 illustrates one embodiment of a bus master 110 coupled to a plurality of serial devices 120–150 sharing a common serial communications bus 160. The serial communications bus 160 carries commands, addresses, and data between the bus master and the serial devices using a command sequence protocol. Typically, the commands include read and write commands associated with specific addresses.

In this embodiment, communications bus 160 includes a clock signal (SCLK 162), a serial data in (SDI 164) to the serial devices from the serial data out (SDO) of the bus master, and a serial data out (SDO 166) from the serial devices to the SDI of the bus master. Commands, addresses, and data are effectively broadcast to all other devices sharing the same serial communications bus.

In order to select a specific serial device for acting on a command or responding to other information communicated on the bus, the serial devices are selectively enabled by a device select signal. In one embodiment, the serial devices include integrated circuit packages and the device select signals are referred to as device select signals.

Each serial device has a device select input (CS) that is asserted to indicate that the device should respond to information being broadcast on the serial communications bus. In order to support unique identification of a plurality of serial devices using the device select signals, bus master 110 must be capable of providing individual device selects, one for each serial device. In the illustrated embodiment, bus master 110 includes a separate device select signal (e.g., CS 172, CS 174, CS 176, CS 178) to enable selecting any one of the serial devices 120–150 uniquely.

The information is serially broadcast to the plurality of devices using a communication protocol consisting of command, address, and data words. Each transmitted bit is communicated substantially simultaneously to all the serial devices. Clock signal SLK 162 is provided by bus master 110 for synchronous transmission of the information. The device selects are used to identify the intended recipients of the command, address, and data words.

Figure 2:
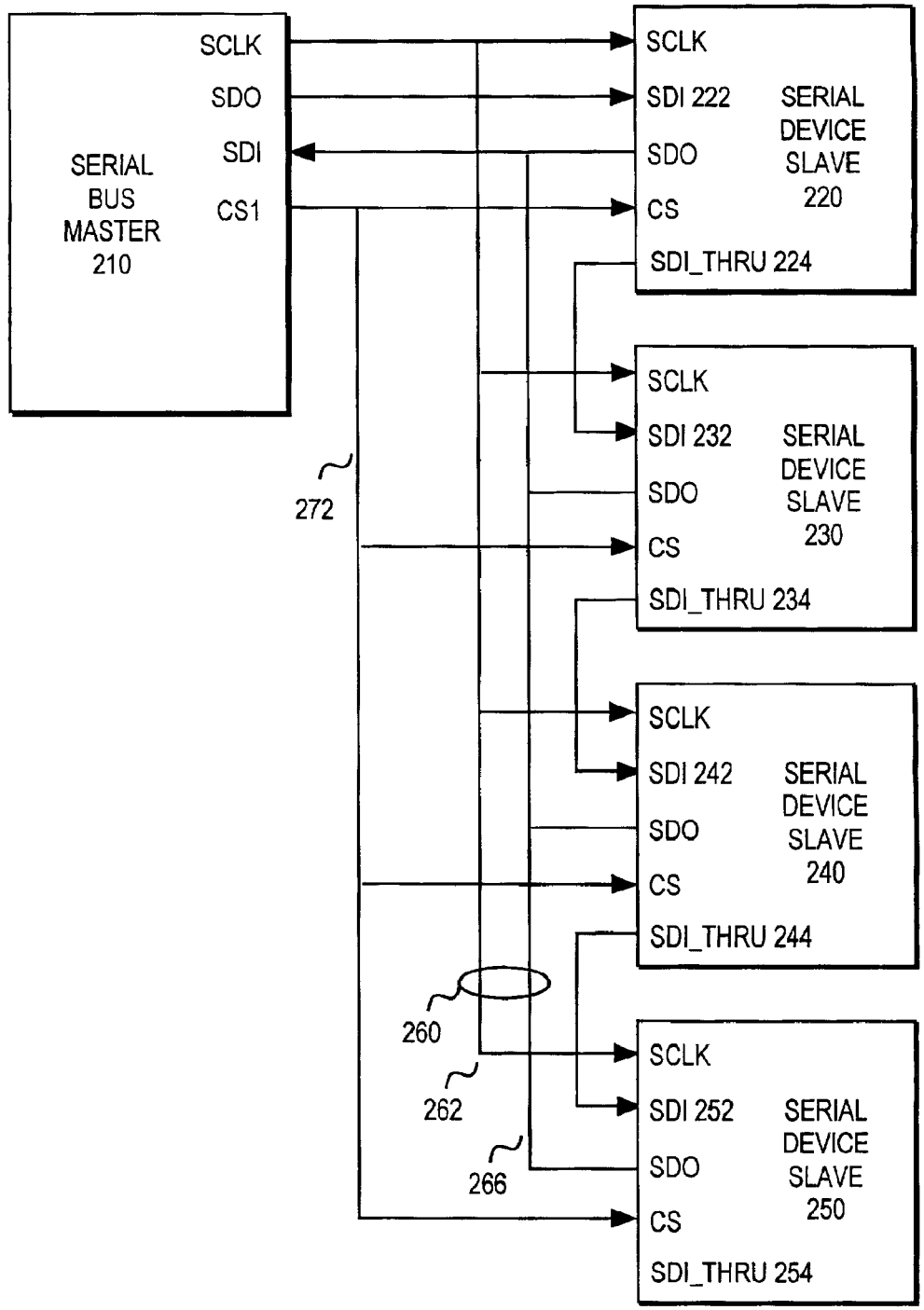
FIG. 2 illustrates a plurality of daisy chained serial devices coupled to a serial bus master.

FIG. 2 illustrates a bus master 210 coupled to a plurality of serial devices 220–250 sharing a common serial communication bus 260. In this embodiment, the plurality of serial devices are coupled in "daisy chain" fashion with respect to the SDI signal. The SDI signal is not part of the shared communication bus 260. The devices are "daisy-chained" such that the SDI input for any serial device is provided by the SDI THRU output of a preceding device in the chain, with the exception of the first device 220 in the chain which receives its SDI signal from the SDO of the bus master 210. In particular, the serial device input port is coupled to the SDI_THRU output port of a preceding device or the bus master. Each serial device receives its SDI signal from a preceding device rather than from the serial communication bus 260.

As illustrated, the SDI input for the first device is provided by the bus master. Thus, the SDI 222 of serial device 220 is provided by bus master 210. The SDI 232 of serial device 230 is provided by SDI THRU 224 of preceding serial device 220. The SDI 242 of serial device 240 is provided by SDI THRU 234 of preceding serial device 230. Finally, SDI 252 for serial device 250 is provided by SDI THRU 244 of preceding serial device 240.

The serial communication bus 260 in common with all devices 220–250 includes the SDO 264 and SCLK 262 signals. All the serial devices in a group share the same device select signal 272. A bus master with a plurality of device selects allows for handling more than one group of serial devices.

Given that the device select is shared with all serial devices in the same group, other mechanisms must be used to differentiate between devices in the same group. In one embodiment, the communication protocol embeds a device or channel identifier (CID) into the command sequence to uniquely identify a specific device or channel when the devices are daisy chained.

Generally, instead of providing a static address for each serial device, the serial device addresses are determined inherently by the device distance from the bus master measured in terms of other serial devices. Each serial device compares its received channel identifier with a pre-determined value to determine whether it has been selected. The CID is modified as it cascades through the daisy chain. This permits all serial devices to compare their respective received CIDs with the same pre-determined value. In various embodiments, the pre-determined value is selected from the set {x0h, xFh}. The devices, however, do not distinguish between daisy chain mode or normal mode in terms of behavior. Accordingly, the behavior of the bus master with respect to device selection and device addressing must change depending upon whether the devices are coupled in daisy chain fashion.

Figure 3:
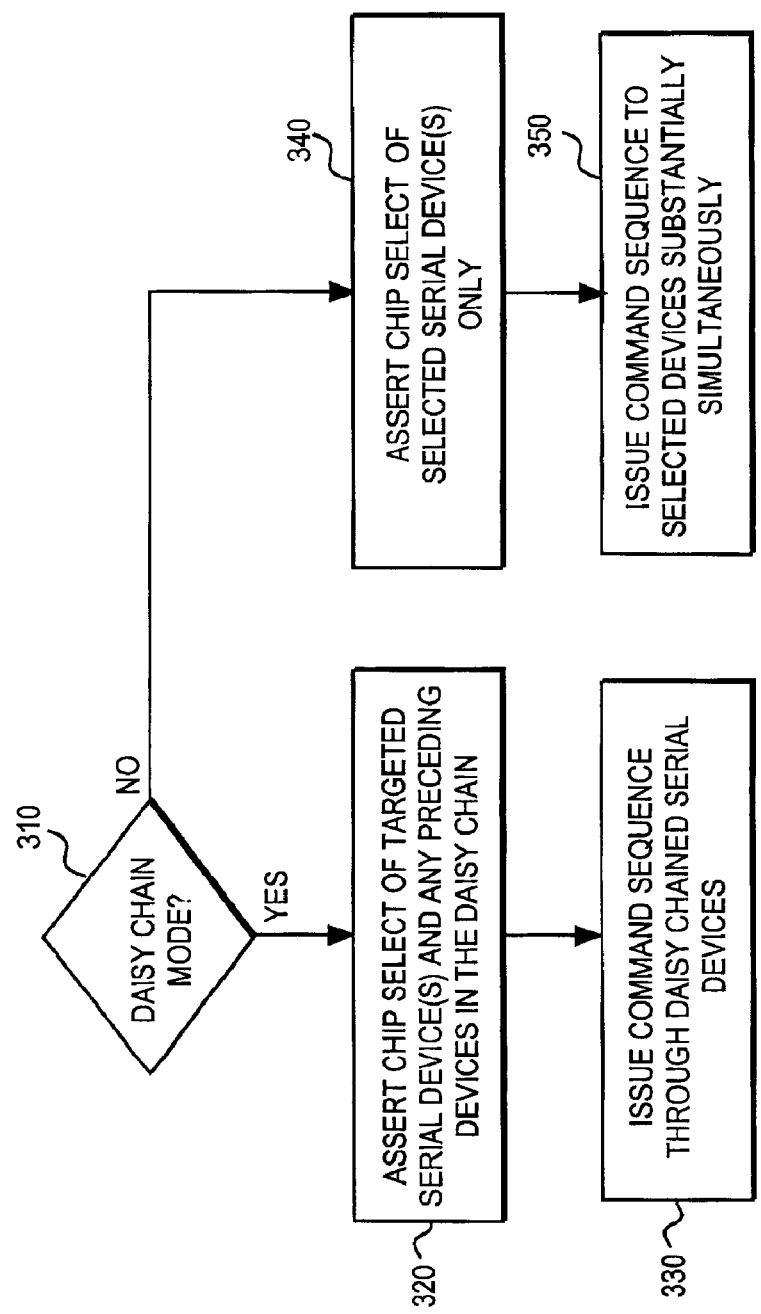
FIG. 3 illustrates a method of operating the bus master in one of a daisy chain or a normal mode.

FIG. 3 illustrates a method of operating the bus master to support either daisy chain or normal communication mode. Step 310 determines the mode of operation. This is determined by the system designer. In one embodiment, a register bit is used to inform the bus master about the selected mode.

If the devices are connected in daisy chain fashion, then the bus master must communicate with the devices in a "daisy chain" mode. The bus master must assert the device select of the selected or targeted serial devices in step 320. Due to the daisy chain implementation, at a minimum all of the serial devices preceding the targeted serial device(s) in the daisy chain must have their corresponding device selects asserted. Typically, all the daisy chained devices will share the same device select as illustrated in FIG. 2. The command sequence is distributed to the plurality of serial devices in step 330. The daisy chained devices receive a command sequence at substantially the same time with delays introduced only as a result of propagation delays through any preceding device in the chain.

If devices are not connected in a daisy chain configuration, then the bus master must assert the device selects of the targeted serial devices to the exclusion of the non-targeted devices in step 340. The same command sequence is then issued substantially simultaneously to the serial devices in step 350.

The serial devices do not distinguish between normal or daisy chain modes of operation because this is determined by the interconnection of the devices. The bus master can use the CID and/or the device selects to identify the targeted devices. In the daisy chain mode, however, the device selects are shared and thus cannot uniquely identify devices. Thus the CID is required in the daisy chain mode. In the normal mode, all the devices receive the same CID, thus the device select is used to uniquely identify devices. Thus neither the device select nor the CID can be used exclusively to identify targeted devices. Instead, both the device selects and the CID are used to identify the device.

Only the behavior of the bus master must change between the two modes. In particular, the CID provided by the bus master in the command sequence changes depending upon the mode of operation.

When in daisy chain mode, the bus master provided CID typically must specifically identify the targeted serial device. The shared device selects are all asserted and thus cannot exclusively target a unique device. Thus in one embodiment, step 330 must ensure that the command sequence specifies the CID of the targeted device.

When in normal mode, the bus master provided CID matches the predetermined value used for comparison by each serial device. Even though all devices receive the same CID, only those devices with their device selects asserted will be targeted. Thus in one embodiment, step 350 provides a command sequence specifying the pre-determined comparison value of all the devices as the CID.

In one embodiment, the communication protocol supports a broadcast option. The broadcast option may be indicated by the command sequence. The serial devices will ignore the CID when the broadcast option is detected. When operating in daisy chain mode, the bus master specifies the CID of the targeted device or ensures the broadcast option is selected to target all devices in step 330. When the bus master is operating in normal mode, the broadcast option has little effect. Given that the broadcast option renders the CID value irrelevant, however, the bus master may provide a CID other than the pre-determined comparison value when the broadcast option is selected in step 350.

Figure 4:
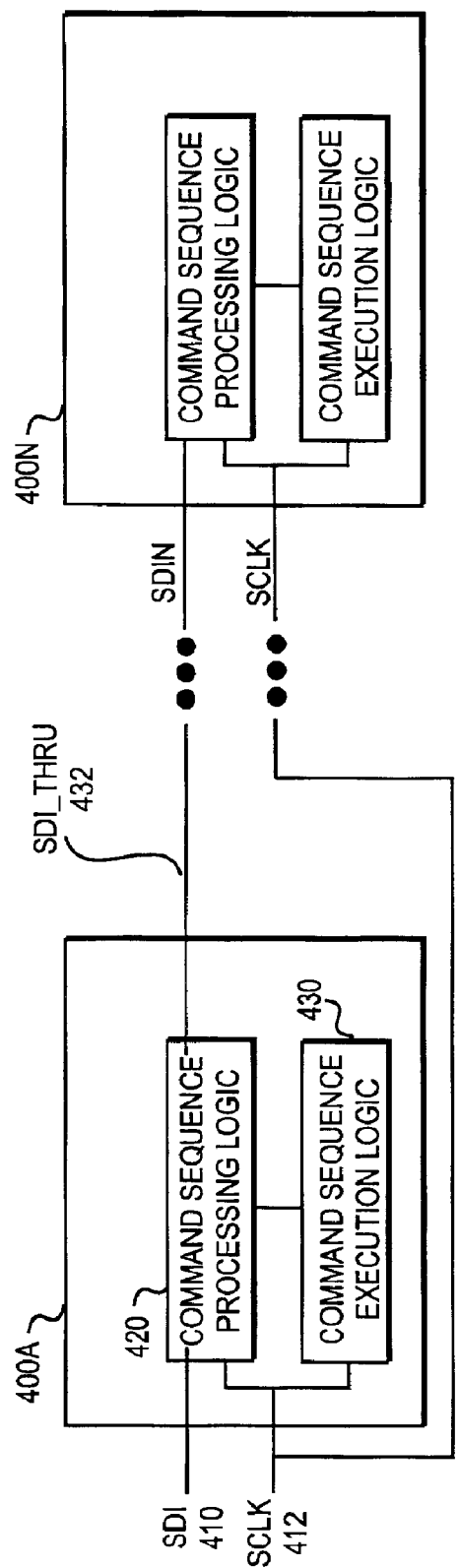
FIG. 4 illustrates circuitry enabling daisy chain operation for individual serial devices.

FIG. 4 illustrates a plurality of daisy chained serial devices including the internal logic to generate modified CIDs for subsequent devices in the chain. The interconnection between the devices determines the mode of operation. In particular, the SDI input ports receive everything directly from the bus master in normal mode. In daisy chain mode, however, the SDI input of one device is the SDI THRU of another device. The command sequence is serially clocked from the bus master to the SDI input of the first serial device in the daisy chain. The SDI THRU 432 output of the first device 400A is provided to the SDI input of the next device in the chain and so on until the last device, 400N.

Command sequence execution logic 430 interprets and executes the command sequence, if the device has been selected as determined from the command sequence (i.e., either the broadcast option is selected or the CID indicates this device is selected). Command sequence processing logic 420 receives the incoming command sequence. Command sequence processing logic 420 extracts the CID for device 400A and modifies the CID and therefore the command sequence for transmission to the next device in the daisy chain.

Figure 5:
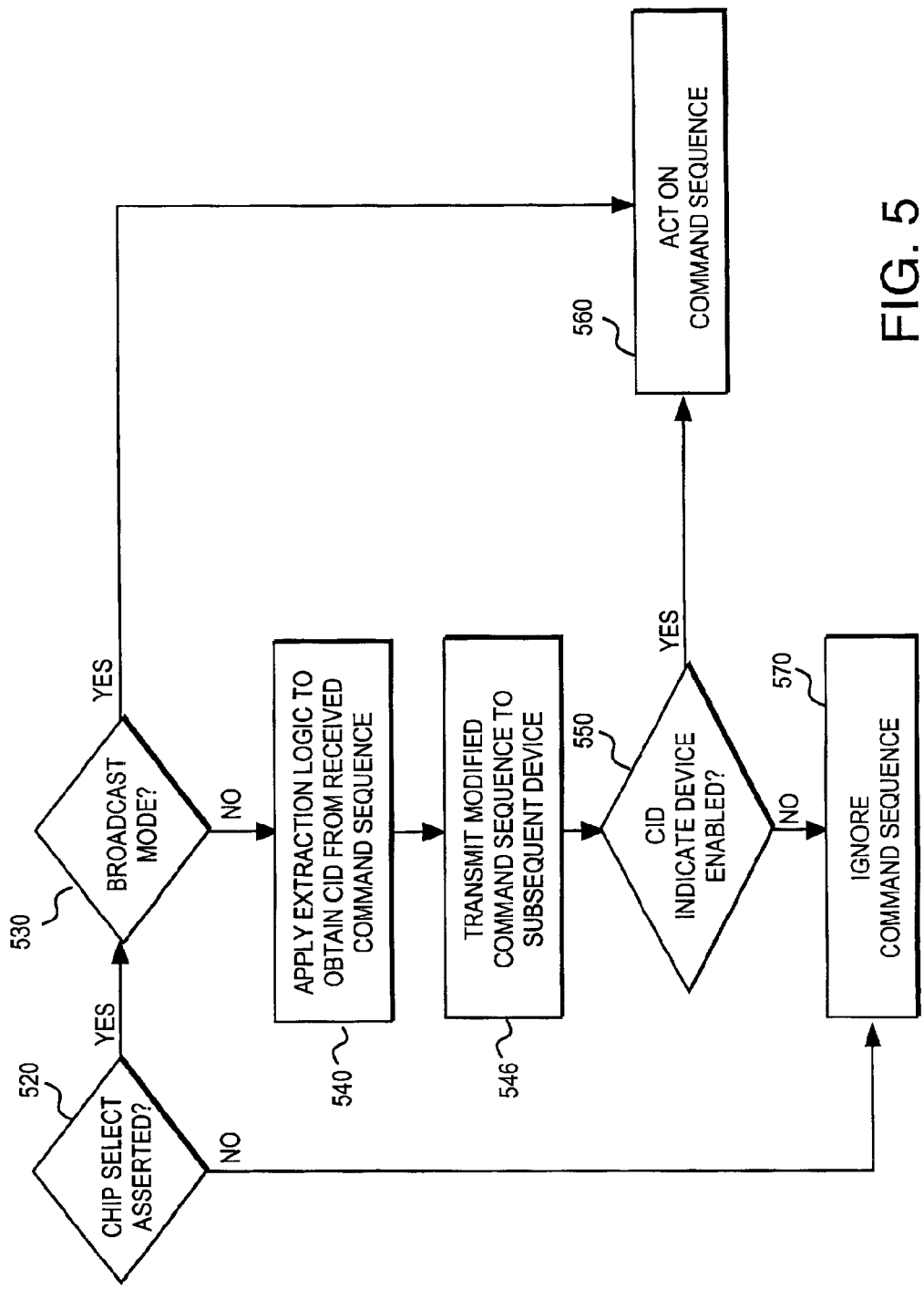
FIG. 5 illustrates one embodiment of a method of operating the individual serial devices in response to the received serial communications.

FIG. 5 illustrates the operational behavior of the serial devices. If the device select signal is not asserted as determined by step 520, then the device ignores the command sequence as indicated by step 570. If the device select is asserted, however, step 530 determines whether the broadcast option has been selected from the command sequence. If so, then the device executes the command sequence irrespective of the CID as indicated by step 560.

If the broadcast option is not selected, the command sequence processing logic extracts the CID from the received command sequence in step 540. The command sequence processing logic modifies the received CID (and therefore the command sequence) and provides the command sequence with the modified CID as its SDI_THRU output for transmission to the next device in the daisy chain in step 546. In particular, the device receives a first command sequence having a first CID and a remaining command sequence. The command sequence processing logic modifies the first CID to form a second CID. The command sequence processing logic generates a second command sequence from the second CID and the remaining command sequence for use by the next device in the daisy chain.

The modification step enables a simple addressing and detection scheme. In one embodiment, the first CID is decremented to generate the second CID. In an alternative embodiment, the first CID is incremented to generate the second CID.

If a device's received CID indicates that the device has been selected in step 550, the command sequence is acted on in step 560. Otherwise, the command sequence is ignored in step 570. A determination of whether the device is the selected device can be achieved by comparing the received CID with a pre-determined value such as x0h or xFh. Rather than programming each device with a unique address for comparison with a commonly received CID, the devices can use a common pre-determined comparison value because the serial CID modification scheme ensures each device receives a unique CID when the devices are in a daisy chain mode. Due to the nature of the daisy chain, however, there is only a single clock cycle delay permitted between receipt of a bit and transmission of the bit to the next device. Accordingly, the command sequence protocol must be designed to permit serial modification within the window of opportunity presented by the daisy chain configuration.

Figure 6:
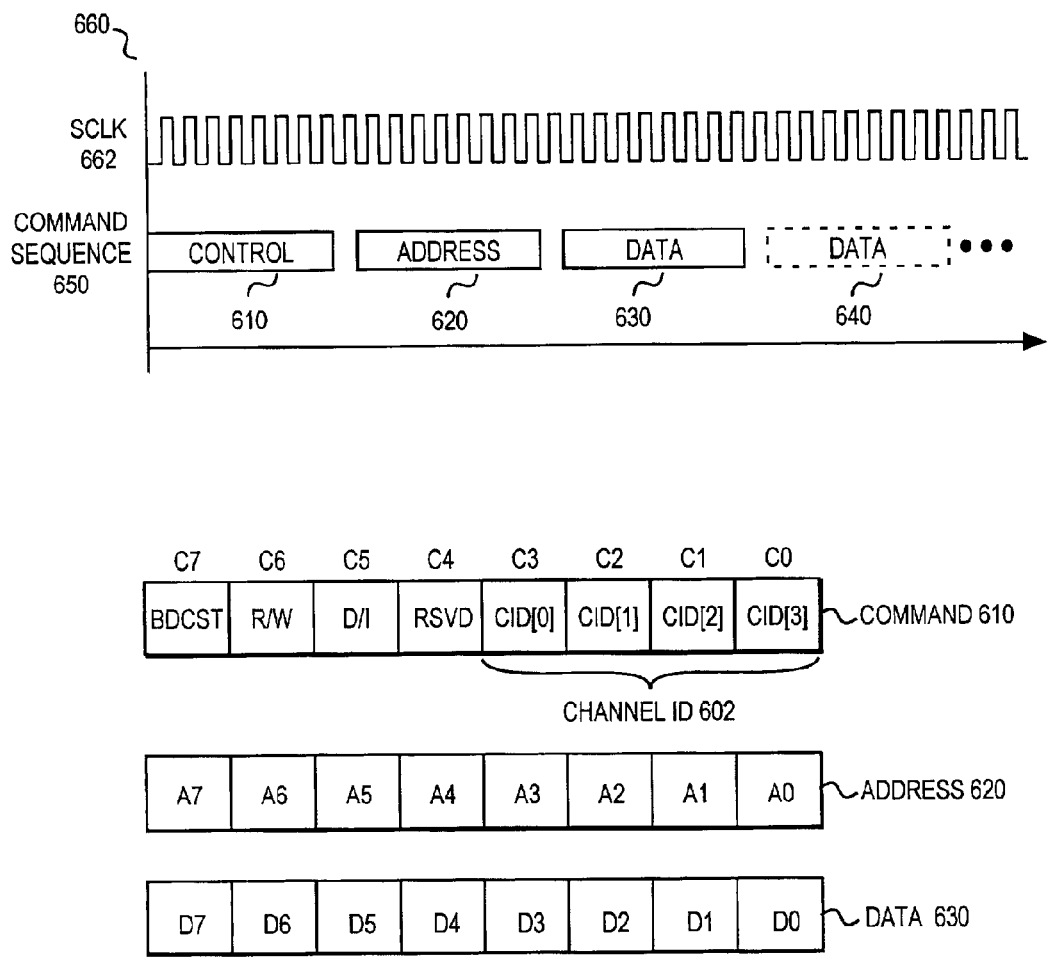
FIG. 6 illustrates one embodiment of a command sequence protocol for the daisy chain mode of operation.

FIG. 6 illustrates one embodiment of a command sequence protocol. The command sequence protocol consists of control 610, address 620, and data 630, 640 words. As indicated by timing diagram 660, each command sequence 650 begins with a control word followed by an address word and then one or more data words.

In the illustrated embodiment, each address and data word is 8 bits long. The command word includes a bit (C7) to indicate whether the broadcast mode is enabled such that any CID address can be ignored. R/W bit (C6) indicates whether the command is a read or a write command. Bit C5 indicates the addressing mode, direct or indirect. One bit is reserved for future use (C4). The remaining bits represent the embedded CID. Although the command sequence is transmitted in most significant bit (msb) order, the CID is stored in least significant bit (lsb) order within the command word to facilitate CID modification within the modification window.

The $i+1^{th}$ device receives the $k^{th}$ bit of the command sequence cascaded thru the $i^{th}$ device. Accordingly, the $i+1^{th}$ device starts receiving the CID before the $i^{th}$ device has received all of it. Modification of the CID must take place without knowledge of the entire word during daisy chain mode. The CID can be incremented or decremented within a single clock cycle. In order to properly increment or decrement the CID serially, however, the bits must be provided least significant bit first. A serial adder or serial subtractor circuit can thus provide the requisite modification within the one bit delay window.

FIG. 7 illustrates one embodiment of CID embedding and modification for a four bit CID. The CID column 710 identifies the 4 bit values assigned to the devices beginning with the device adjacent to the bus master and counting along the daisy chain away from the bus master. The values of column 710 are presented in most significant bit (msb) form. The embedded command word received column 720 illustrates the corresponding CID of column 710 as it would be embedded in lsb order. This is the value that the bus master must embed in order to select the corresponding device. The embedded command word transmitted column 730 illustrates the value that the CID of column 720 will be modified to.

In this example, each device compares the received command word with the value x0h to determine if it has been selected. The value "0000" will result in the selection of the device adjacent the bus master in the daisy chain.

Figure 8:
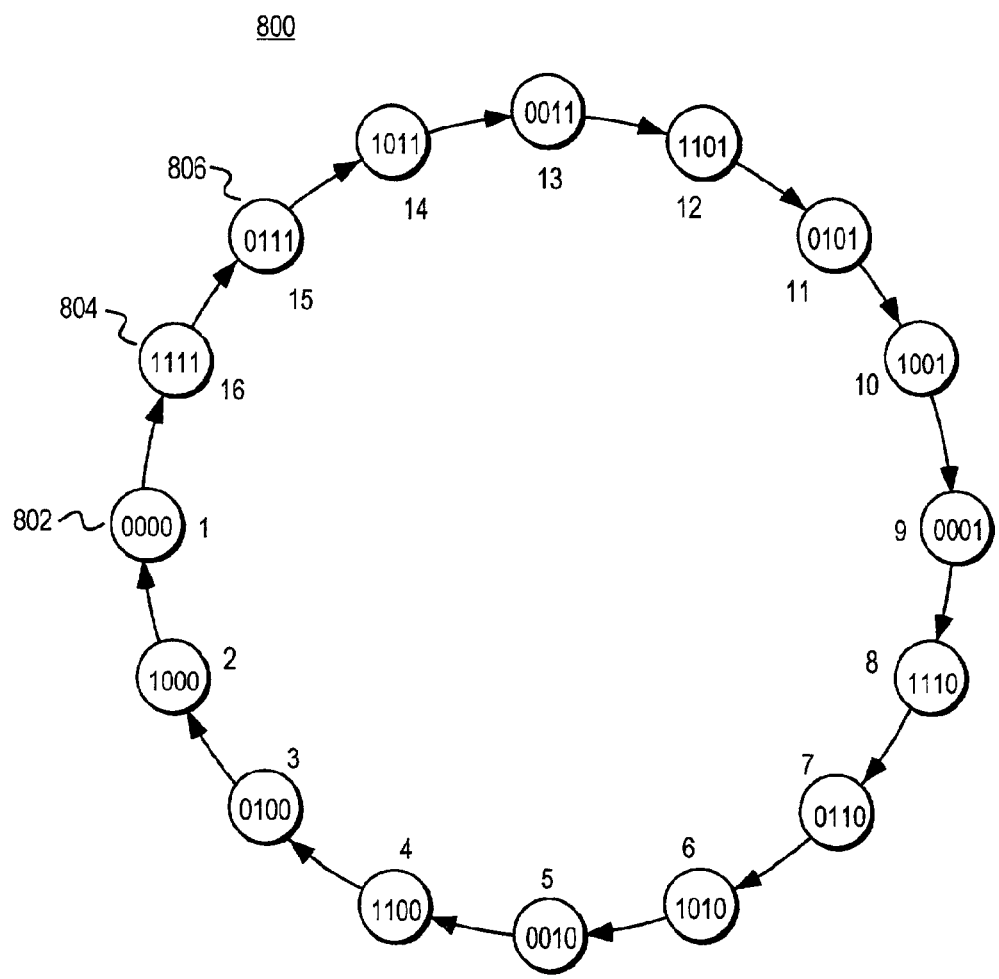
FIG. 8 illustrates an embedded CID state diagram as the CID passes through daisy chained serial devices.

FIG. 8 illustrates table 700 in another form. Each CID state 802, 804, 806, etc. has a value corresponding to a given device's received CID. The given device modifies its received CID to the value indicated by the next state (following the direction of the arrows). The inner circle of numbers represents the associated channel or device identifier counting away from the bus master. To target device 16, for example, the bus master should provide a command sequence with the embedded CID value "1111." Starting at this state (804) and counting each state until the value "0000" is reached, one can see the transitions made in the CID as it passes from device to device in the daisy chain until the value "0000" is reached at the 16$^{th}$ device.

The enhanced daisy chain methods and apparatus enable addressing serial devices by their relative distance from a bus master. There is no need to set pins or switches on each individual device. This daisy chain technique ensures each serial device is inherently assigned a unique address. The behavior of the individual serial devices is independent of the daisy chain or normal mode of configuration. The bus master, however, must control the device selects and the CID in a manner determined by whether the devices are daisy chained or not.

In various embodiments, the serial devices may be packaged such that more than one device resides within a common integrated circuit package. Thus a plurality of channels may be associated with a single integrated circuit package. In such cases, the channel identifier is modified by each device as it passes through the daisy chained devices within the integrated circuit package such that the channel identifier may be modified more than once as it progresses from an SDI input of the integrated circuit package (going to the first device in the daisy chain) thru a plurality of daisy chained devices within the package to an SDI_THRU output of the integrated circuit package (associated with the last device in the daisy chain).

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising the steps of:
    a. coupling a plurality of devices in a daisy chain, wherein each device performs the steps of:
        i) receiving a received command sequence including a received channel identifier;
        ii) executing the received command sequence if the received channel identifier matches a pre-determined value, wherein the pre-determined value is the same for each of the plurality of daisy-chained devices; and
        ii) modifying the received channel identifier within the received command sequence to generate a modified command sequence having a modified channel identifier for transmission to a next device of the daisy chain, wherein the modified command sequence is the received command sequence for that next device of the daisy chain.

2. The method of claim 1 wherein the command sequence includes a command word, an address word, and at least one data word.

3. The method of claim 1 wherein the predetermined value is a selected member of the set {xOh, xFh}.

4. The method of claim 1 wherein step a)(iii) further comprises the step of incrementing the received channel identifier to form the modified channel identifier.

5. The method of claim 1 wherein step a)(iii) further comprises the step of decrementing the received channel identifier to form the modified channel identifier.

6. The method of claim 1 wherein the received channel identifier is provided in least significant bit order within the command sequence.

7. The method of claim 1 further comprising the steps of:
    d) transmitting the same command sequence to all of the serial devices substantially simultaneously when in a broadcast mode; and
    e) cascading the command sequence through the serial devices when in a daisy chain mode.

8. An apparatus comprising a plurality of serial devices, wherein each serial device comprises:
    a serial input port for receiving a first command sequence having a first channel identifier and a remaining command sequence;
    a daisy chain output port;
    command sequence processing logic for modifying the first channel identifier to form a second channel identifier, wherein the command sequence processing logic provides the second channel identifier and the remaining command sequence to the daisy chain output port; and
    command execution logic for executing the remaining command sequence if the first channel identifier matches a pre-determined value, wherein each of the plurality of serial devices uses the same pre-determined value.

9. The apparatus of claim 8 wherein the first channel identifier is incremented to form the second channel identifier.

10. The apparatus of claim 8 wherein the first channel identifier is decremented to form the second channel identifier.

11. The apparatus of claim 8 wherein the first channel identifier is stored in least significant bit order within the command sequence.

12. The apparatus of claim 8 wherein the predetermined value is a selected member of the set {xOb, xFh}.

13. An apparatus comprising:
    a bus master providing an initial command sequence having an initial channel identifier;
    a plurality of serial devices, each device comprising:
        a serial input port for receiving a first command sequence having a first channel identifier and a remaining command sequence;
        a daisy chain output port; and
        command sequence processing logic for modifying the first channel identifier to form a second channel identifier, wherein the command sequence processing logic provides the second channel identifier and the remaining command sequence to the daisy chain output port; and
        command execution logic, wherein the command execution logic executes the remaining command sequence if the first channel identifier matches a pre-determined value shared by the plurality of serial devices;
    a bus selectively coupling the serial devices in one of a non-daisy-chain normal configuration and a daisy chain configuration, wherein the initial channel identifier is the first channel identifier for the device receiving the initial command sequence, wherein when coupled in the daisy chain configuration the second channel identifier provided by any selected serial device is received as the first channel identifier by the next serial device of the daisy chain, wherein when coupled in a non-daisy-chain configuration each of the devices receives a same first command sequence.

14. The apparatus of claim 13 wherein the bus master provides the initial command sequence with the initial channel identifier selected from the set of {xOh, xFh} when the devices are coupled in the normal configuration, wherein each of the plurality of devices receives the initial command sequence substantially simultaneously.

15. The apparatus of claim 13 wherein when coupled in the daisy chain configuration, the bus master provides the initial command sequence to a first serial device of the plurality of devices, wherein each subsequent device receives a modified command sequence including its associated second channel identifier and the remaining command sequence provided by a preceding serial device, wherein the plurality of second channel identifiers is distinct.

16. The apparatus of claim 13 wherein the predetermined value is a selected member of the set {xOh, xFh}.

17. The apparatus of claim 13 wherein the bus master provides the initial channel identifier in least significant bit order within the initial command sequence, wherein the initial command sequence is provided in most significant bit order.

* * * * *